United States Patent [19]

Buck et al.

[11] Patent Number: 4,467,775

[45] Date of Patent: Aug. 28, 1984

[54] METHOD AND APPARATUS FOR CONTROLLING RECIRCULATED QUANTITIES OF EXHAUST GAS IN INTERNAL COMBUSTION ENGINES

[75] Inventors: Rainer Buck, Tamm; Thomas Küttner, Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 421,669

[22] Filed: Sep. 22, 1982

[30] Foreign Application Priority Data

Nov. 17, 1981 [DE] Fed. Rep. of Germany ....... 3145527

[51] Int. Cl.³ .............................................. F02M 25/06
[52] U.S. Cl. ..................................... 123/571; 123/569
[58] Field of Search ................................ 123/571, 569

[56] References Cited

U.S. PATENT DOCUMENTS

| 4,142,493 | 3/1979 | Schira et al. | 123/571 |
| 4,164,032 | 8/1979 | Nohara et al. | 123/571 X |
| 4,164,206 | 8/1979 | Toelle | 123/571 |
| 4,378,776 | 4/1983 | Nishimori | 123/571 |

Primary Examiner—Wendell E. Burns

Attorney, Agent, or Firm—Edwin E. Greigg

[57] ABSTRACT

A method and an apparatus are proposed for controlling the quantity of exhaust gas recirculated from the exhaust gas system of an internal combustion engine to its intake side. The aspirated air quantity is compared with a set-point value formed in accordance with load and rpm, and if the deviation is greater than a minimum amount, control pulses for two magnetic valves are formed, which are triggered alternatively depending upon the polarity of the deviation and which further cause pressure to be delivered from two pressure sources having different pressure levels into the work chamber of a pneumatically functioning adjusting member of a dosing valve for exhaust gas recirculation. The opening duration of a given valve is dependent on the magnitude of the deviation from the set-point, and the valve remains completely open until a counteracting correction takes place if the deviation from the set-point exceeds a predetermined maximum amount. The control pulses formed in the range between a minimum and a maximum deviation from the set-point are carried further to the magnetic valves after the elapse of a predetermined waiting period ($T_w$). The waiting period may be made dependent on rpm.

24 Claims, 3 Drawing Figures

METHOD AND APPARATUS FOR CONTROLLING RECIRCULATED QUANTITIES OF EXHAUST GAS IN INTERNAL COMBUSTION ENGINES

BACKGROUND OF THE INVENTION

The invention is based on a method for controlling recirculated exhaust gas quantities as generally described hereinafter. In a method of this kind known from U.S. Pat. No. 4,177,777, the quantity of air aspirated by the internal combustion engine is measured by means of an air flow rate meter, and the control pressure of a pneumatically actuatable exhaust recirculation valve is varied in accordance with the air flow rate signal thus controlling the quantity of recirculated exhaust gas. In another embodiment described in this same patent, the quantity of recirculated exhaust gas is measured and compared with a set-point value formed on the basis of the air flow rate signal, and the adjustment of the exhaust gas recirculation valve is then varied in accordance with the resultant correction signal.

In the first method discussed above, the disadvantage is that the recirculated exhaust quantity is merely controlled in open-loop fashion, without being able to detect possible error-producing conditions, which may be associated particularly with the triggering of the exhaust recirculation valve. The control pressure in the pneumatic exhaust recirculation valve of the known type is established with the aid of a magnetic valve, which controls a connection with the ambient air, while at the same time the pressure chamber of the pneumatic valve communicates continuously with the intake manifold downstream of a throttle valve. The vacuum pressure (underpressure) at that location is naturally substantially dependent upon the load and on engine speed, which cannot be compensated for precisely in the first method above.

In the second method discussed above, a measurement apparatus is required for measuring the actual quantity of recirculated exhaust gas supplied, which is expensive. Furthermore, here as well the apparatus for establishing the control pressure as described above, having only a single magnetic valve which controls communication with the ambient air, is disadvantageous, because in every case where the exhaust recirculation valve is not supposed to be completely open, air is supplied to the intake manifold via this magnetic valve but is not detected by the air flow rate measuring means. This is particularly critical in the case where the exhaust gas recirculation valve sticks in a middle position or in the closed position.

OBJECT AND SUMMARY OF THE INVENTION

The method according to the invention has the advantage over the known method that a comparison of the actual air quantity with the set-point air quantity is performed, and the set-point value can be formed in a substantially simpler manner. The dosing of air quantities is advantageously effected via the dosing of the recirculated exhaust gas quantity, for example.

The method according to the invention has the further advantage that a correction is made only when the deviation from the set-point air quantity on the part of the actual air quantity is beyond a predetermined magnitude, so that the frequency of actuation of the adjusting device can be kept quite low. Additionally, in the correctly controlled state of the adjusting device, no control pressure is consumed. Within this period of time, it is not necessary to perform corrections when there are varying pressures in the pressure sources.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
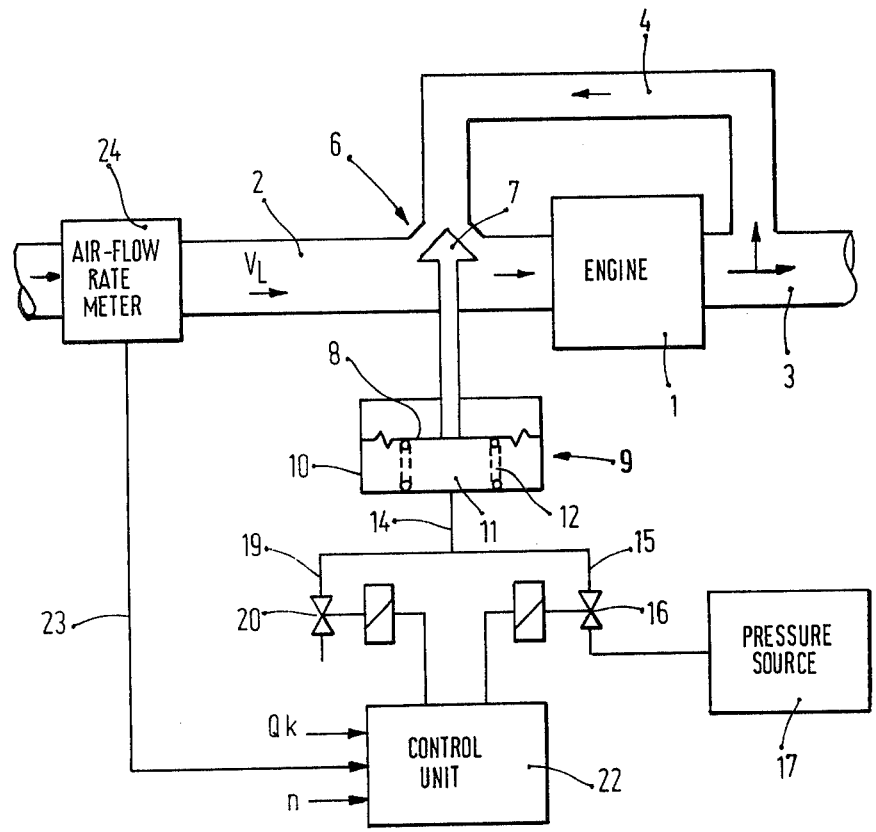
FIG. 1, in schematic form, shows an apparatus for performing the method according to the invention.

FIG. 1 shows an internal combustion engine 1 having an intake system 2 and an exhaust manifold system 3, shown in a simplified representation. An exhaust gas recirculation line 4 leads from the exhaust manifold system 3 to the intake system 2. In the exhaust recirculation line or, as shown in FIG. 1, at the mouth of the exhaust gas recirculation line 4 discharging into the intake system 2, an exhaust recirculation valve 6 is provided, the valve closing member 7 of which cooperates with the mouth of the exhaust recirculation line acting as a valve seat. The valve closing member 7 is connected with a movable wall 8 of a pneumatic adjusting device 9, which conventionally comprises a housing 10 in which a work chamber 11 is tightly enclosed, for instance by means of a diaphragm 8. The diaphragm 8 is stressed by a restoring spring 12. A control pressure line 14 discharges into the work chamber 11 and communicates with a vacuum source 17 via a first pressure line 14, in which a first electromechanically actuatable valve, for instance a magnetic valve 16, is disposed. The control pressure line 14 further communicates with the ambient air via a second pressure line 19, in which a second electromechanically actuatable valve 20 is disposed. Both magnetic valves 16 and 20 are triggered by a control apparatus 22, which with a control signal line 23 is connected to an air-flow rate meter 24. The air-flow rate meter 24 is disposed in the intake line of the intake system 2 and detects the quantity of fresh air aspirated by the engine. Further operating parameters are also delivered to the control apparatus 22 for forming the set-point value for the air quantity, examples of such parameters being a load signal $Q_K$ and an rpm signal n.

Figure 2:
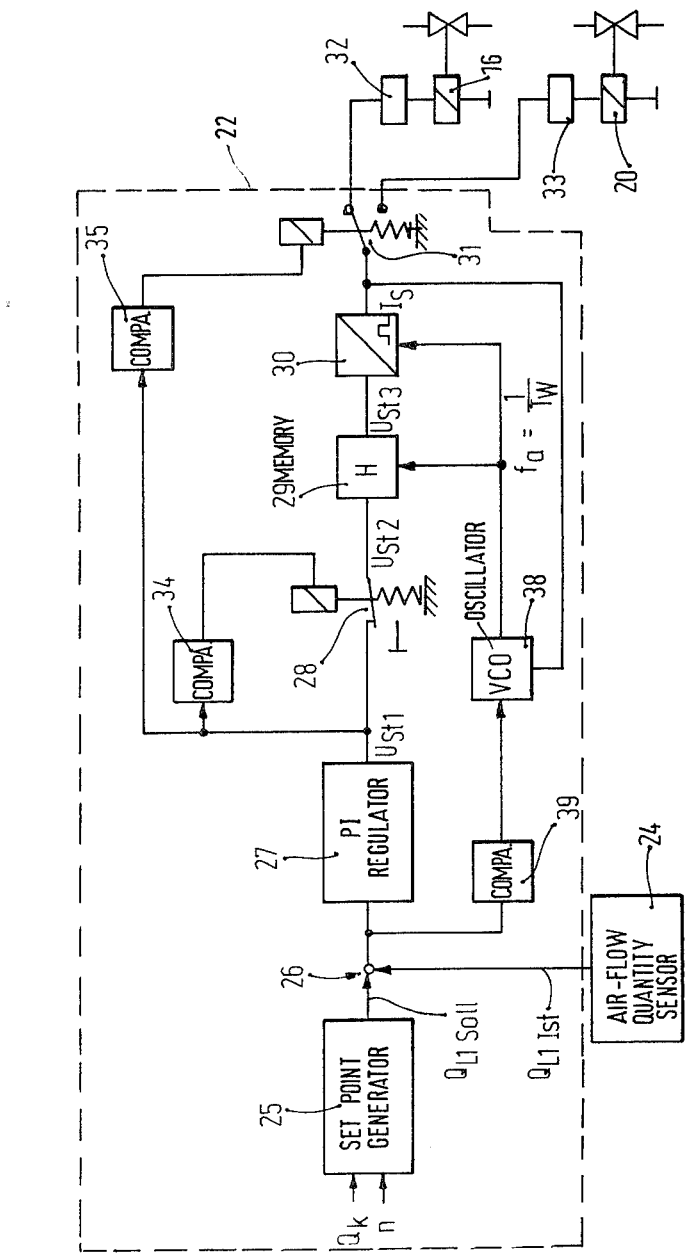
FIG. 2 illustrates a switching principle for the control apparatus for triggering the pneumatic exhaust recirculation valve of FIG. 1.

The basic structure of the control apparatus 22 is shown in FIG. 2.

For forming the set-point value, FIG. 2 shows a set-point value generator 25, which may be embodied as a two-dimensional performance graph or characteristic curve data in which the values for the set-point aspirated air quantity are stored in memory in accordance with load and rpm. A transducer 24 is also provided for the actual aspirated air quantity, the output valve of this transducer being carried, together with the set-point value for the aspirated air quantity, to a comparison device 26. The output of the comparison device 26 is connected with a PI regulator 27, the output of which is carried via a first switch 28 to a memory 29. The memory 29 is followed by a pulse shaper circuit 30, the output of which is connected via a second switch 31 with the winding of either the first magnetic valve 16 or the second magnetic valve 20. The coils of the two magnetic valves are preceded by respective end stages or final control elements 32 and 33 which are known per se (see, for example, element 28 in U.S. Pat. No. 4,265,200).

The first switch 28 is controlled by a comparator 34, which is connected with the output of the PI regulator 27. The amount of the output signal of the PI regulator is monitored in terms of a minimum value by the comparator 34, and if the amount exceeds the minimum value, the first switch 28 is closed, establishing the connection between the holding element 29 and the PI regulator 27. The second switch 31 is controlled by a comparator 35, the input of which is likewise connected with the output of the PI regulator 27. This comparator ascertains whether the output signal of the PI regulator is greater than or less than zero. In accordance with the output signal, the second switch 31 then connects the output of the pulse shaper circuit 30 with either the end stage 32 or the end stage 33.

The output of the pulse shaper circuit 30 is further connected with a voltage-controlled oscillator 38, the output of which triggers the memory 29 and the pulse shaper circuit 30. The voltage-controlled oscillator 38 is further controlled by the output signal of a comparator 39, which compares the absolute value of the output signal of the comparison device 26 with an upper threshold value.

The control apparatus functions as follows:

In accordance with a load signal and an rpm signal, which may be obtained in a manner known per se, the instantaneous set-point value $Q_{L1}$, Soll for the quantity of air to be supplied to the engine is produced from the performance graph of the set-point generator 25 and compared with the signal produced by the air flow rate meter 24 for the actual air quantity $Q_{LI}$, Ist in the comparison device 26. The difference between the two values is amplified in the PI regulator 27, the amplification being effected substantially proportionally with an integral component relaiting to longterm operation. The control variable thus obtained is monitored in terms of two aspects, the first being whether the amount of the control variable is greater or less than a minimum value; this monitoring is done by the comparator 34. Only beyond a predetermined magnitude of deviation of the aspirated air quantity from the set-point value is the first switch 28 closed and the control variable carried on to the memory 29. The second monitoring, by means of the comparator 35, ascertains the direction or polarity of deviation of the air quantity from the set-point value. In accordance with this, either the first magnetic valve 16 or the second magnetic valve 20 is triggered by means of a corresponding switchover of the second switch 31. The comparator 35, during this operation, merely ascertains the algebraic sign (+ or −) of the control variable emitted by the PI regulator 27. Upon the opening of the magnetic valve 16, the vacuum in the work chamber 11 is increased, and the valve closing member 7 of the exhaust gas recirculation valve 7 is opened counter to the force of the spring 12, so that an increased exhaust gas quantity can be recirculated. If the second magnetic valve 20 is opened instead, this causes an increase in the control pressure in the work chamber 11 and thus causes the exhaust gas recirculation valve to close. Intermediate pressures can be retained by closing both magnetic valves, so that the valve closing member 7 is also capable of remaining in a middle position.

The conversion of the control variable into an adjusting variable for the magnetic valves 16 and 20 is effected in the pulse shaper circuit 30, where the amount of the control variable is converted in a manner known per se into pulses having a pulse width corresponding to the amount of the control variable. The pulse shaper circuit 30 and the memory 29 are triggered by the voltage-controlled oscillator 38. In response to a trigger signal, the value stored in the memory 29 is carried further to the pulse shaper circuit 30. With this pulse, the voltage-controlled oscillator 38 is simultaneously controlled as well, in such a manner that as long as a pulse is present, the frequency of the oscillator 38 is set at a very low value, so that a new trigger pulse can be emitted to the memory 29 or to the pulse shaper circuit 30 only after a waiting period $T_W$ has elapsed. If on the other hand no pulse is present at the output of the pulse shaper circuit 30, the oscillation frequency of the voltage-controlled oscillator 38 is set to a very high value, so that the waiting period $T_W$ tends toward zero, and the most recently stored value in the memory 29 is converted directly into an adjusting pulse. A very high frequency is also emitted by the voltage-controlled oscillator 38 if it is ascertained with the aid of the comparator 39 that the amount of the deviation has exceeded a maximum value. Then the output frequency of the oscillator 38 remains high, independently of the output signal of the pulse shaper circuit 30, so that adjusting pulses can be emitted continuously.

This apparatus has the advantage that when deviations are small, that is, below the threshold fixed in the comparator 34, no adjustment variables for triggering the magnetic valves 16 and 20 can be generated. Both valves accordingly remain closed, so that the valve closing member 7 remains in its most recently assumed position. Adjusting variables are generated only after the deviation of the actual air quantity from the set-point air quantity has become overly large; the adjusting variables are then furnished to either the one or the other magnetic valve, depending on the polarity of the deviation, as noted earlier. The control apparatus is designed such that a predetermined waiting period $T_W$ between sequential adjusting pulses is maintained. Thus the dead time of the regulating path is appropriately taken into consideration. Following a change in the quantity of recirculated exhaust gas, there is first a waiting period until some new value is established at the air flow rate meter 24. If this value is found to be a deviation which is greater than the threshold value fixed in the comparator 34, then a new corrective pulse is emitted, which depending upon the polarity of the deviation varies the working pressure in the work chamber 11 in one direction or the other. If in contrast a very substantial deviation from the set-point value has taken place, this is ascertained by the comparator 39. In that case, a correction must be made rapidly, and a continuous corrective pulse is generated via the voltage-controlled oscillator 38.

The waiting period $T_W$ valid for normal operation can also be varied in accordance with rpm for the sake of improved adaptation. With the rpm control value, which triggers the set-point value generator 25, the low frequency of the voltage-controlled oscillator 38 can simultaneously be established as well.

By introducing a dead zone at the level of the threshold value of the comparator 34, overly frequent switching at minimal deviations is avoided. In particular, the establishment of a threshold-value cycle is avoided. The waiting period $T_W$ also prevents overly frequent switching. It is advantageous that the pulse widths with which the magnetic valves are triggered are in proportion with the amount of the deviation.

Figure 3:
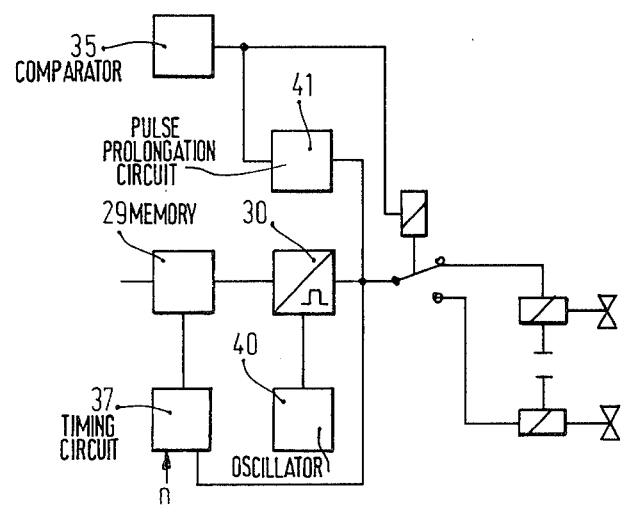
FIG. 3 shows a supplementary realization of the control apparatus.

Alternatively, as shown in FIG. 3, the pulse shaper circuit 30 can also be controlled by its own oscillator 40, and the memory 29 can be controlled by the output of the pulse shaper circuit 30 via a timing element 37. As long as a pulse is present at the output of the pulse shaper circuit 30, the memory is blocked via the timing element 37. Following the pulse, the timing element 37 continues to keep the memory 29 blocked for the duration of a waiting period $T_W$; after this period has elapsed, a new value for a pulse shaping is emitted to the pulse shaper circuit 30. The waiting period of the timing element 37 can likewise be controlled in accordance with rpm.

A further realization of the invention provides that the comparator 35 controls a pulse prolongation circuit 41, which upon each switchover of the comparator 35 adds a prolonging pulse to the pulse emitted by the pulse shaping circuit 30. In this manner, a hysteresis on the part of the pneumatic switching valve is advantageously eliminated, so that the exhaust gas recirculation valve is capable of responding rapidly to changing conditions.

In particular, the above-described invention makes it possible to obtain a control element for an exhaust gas recirculation valve at good value for its price, which has a low power requirement and consumes a low quantity of adjusting medium. Furthermore there is only slight stress on the switching elements, in particular on the magnetic valves, because of the reduced frequency of switching.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for controlling the quantity of exhaust gas recirculated from the exhaust gas system of an internal combustion engine to its intake side including ascertaining the aspirated air quantity and controlling the recirculated exhaust gas quantity in accordance with the aspirated air quantity, comprising the steps of, forming set-point values for the aspirated air quantity in accordance with operating parameters of the engine, comparing the actual air quantity at any give time with said set-point values, generating a control variable signal in accordance with the result of said comparison step, and actuating with said signal an adjusting device for an exhaust gas recirculation quantity dosing valve, whereby the air quantity is corrected by means of varying the recirculated exhaust gas quantity.

2. A method as defined by claim 1, further comprising the steps of, monitoring the control variable signal in terms of its value with respect to a minimum value and converting said signal into an adjustment variable signal for the actuation of the adjusting device only when the minimum value has been exceeded, whereby the adjusting device operates such that the most recently established position of the closing valve is retained when the adjusting device is not actuated.

3. A method as defined by claim 2, wherein the control variable signal is formed by means of proportional amplification and integration of the result of said comparison step.

4. A method as defined by one of the claims 2 or 3, comprising the further steps of operating the adjusting device by means of a pneumatic pressure medium, forming the working pressure of the adjusting device as a mixture of the pressures from two pressure sources, and alternately closing and opening the sources to the adjusting device in accordance with the adjustment variable signal.

5. A method as defined by claim 4, wherein the control variable signal is converted into pulses serving as an adjustment variable signal, whereby the effective current of the pulses per unit of time is proportional to the value of the control variable signal.

6. A method as defined by claim 4, further comprising the steps of, monitoring the result of said comparison step in terms of the direction of the deviation from the set-point value, forming a control value therefrom, and controlling therewith the delivery of the adjustment variable signal for opening one of the pressure sources to the control device.

7. A method as defined by one of the claims 3 or 5, further comprising the steps of, storing the control variable signal for the duration of a waiting period ($T_W$), and releasing said signal after the waiting period has elapsed for opening the pressure sources.

8. A method as defined by one of the claims 3 or 5, further comprising the steps of, storing the adjustment variable signal for the duration of a waiting period ($T_W$), and releasing said signal after the waiting period has elapsed for opening the pressure sources.

9. A method as defined by claim 7, further comprising the step of, controlling the waiting period in accordance with the rpm.

10. A method as defined by claim 8, further comprising the step of, controlling the waiting period in accordance with the rpm.

11. A method as defined by claim 7, further comprising the steps of, comparing the value of the control variable signal with a threshold value, and reducing the waiting period ($T_W$) to zero when the threshold value is exceeded by the control variable signal.

12. A method as defined by claim 7, further comprising the steps of, comparing the value of the adjustment variable signal with a threshold value, and reducing the waiting period ($T_W$) to zero when the threshold value is exceeded by the adjustment variable signal.

13. A method as defined by claim 5, further comprising the step of, prolonging the pulse width by a predetermined amount of time the first pulse formed after a change in polarity of the deviation of the actual value from the set-point value.

14. A method as defined by claim 1, wherein the set-point air quantity value is formed in accordance with the load and rpm of the engine.

15. An apparatus for controlling the quantity of exhaust gas recirculated from the exhaust gas system of an internal combustion engine to its intake side, having an air flow rate measuring device disposed in the intake manifold of the engine and a pneumatically functioning adjusting member, the movable part of which is connected with the valve closing member of an exhaust gas recirculation valve and the work chamber of which, enclosed by the movable part, communicates via a valve assembly with pressure sources of various pressure levels, controlled by a control apparatus in accordance with at least the output signal of the air-flow rate measuring device, wherein the control apparatus comprises:
- a set-point value generator (25) from which a setpoint value formed in accordance with operating parameters for the quantity of air to be aspirated by the engine can be taken; and
- a comparison device (26), the inputs of which are connected with the set-point value generator and the air flow-rate measuring device and the output of which is connected with the actuation device of the valve assembly.

16. An apparatus as defined by claim 15, further comprising: a regulating amplifier (27), the output of which is connected via a first switch (28) with an adjusting-variable shaper circuit (30), to which at least one electromechanical switching member (16, 20) of the valve assembly is connected, and the first switch is controlled by means of a threshold switching device (34), which is controlled by the output signal of the regulating amplifier for comparing the absolute value of the output signal with a threshold value.

17. An apparatus as defined by claim 16, wherein the valve assembly comprises two electromechanically actuatable valves (16 and 20), which are respectively disposed in a connecting line (15, 19) between the pressure sources and the work chamber (11) of the pneumatic adjusting member (9), and further comprising: a reversing switch (31) connected between the adjusting-variable shaper circuit (30) and the valves (16, 20) and controlled by a control member (35) for detecting the polarity of the output signal of the regulating amplifier (27).

18. An apparatus as defined by claim 17, wherein the adjusting-variable shaper circuit (30) is a pulse shaper circuit and further comprising: a signal memory (29) preceding the pulse shaper circuit, and a voltage-controlled oscillator (38) for triggering the pulse shaper circuit and the signal memory.

19. An apparatus as defined by claim 18, wherein the input of the oscillator (38) is connected with the output of a threshold value switch (39), the input of which is controlled by the output of the comparison device (26), whereby the threshold value switch compares the absolute value of the output signal with an upper threshold value, and when this value is exceeded the frequency of the oscillator (38) is brought to a high value.

20. An apparatus as defined by claim 19, wherein the output of the pulse shaper circuit (30) is connected with the oscillator, whereby the oscillator is controlled to a high or low frequency value depending upon the presence or absence of a pulse at the output of the pulse shaper circuit.

21. An apparatus as defined by claim 19, further comprising, a pulse prolongation device connected to the control member (35), whereby upon the switchover of the control member emits a prolongation pulse to the output of the pulse shaper circuit (30).

22. An apparatus as defined by claim 19, further comprising a timing element (37) coupled to the output of the pulse shaper circuit (30) and connected with the memory (29), whereby the memory is triggered by the output signal of the timing element.

23. An apparatus as defined by claim 22, wherein the delay period of the timing element is variable in accordance with the rpm.

24. An apparatus as defined by claim 15, wherein the set-point value generator (25) comprises a two-dimensional performance graph memory, whereby set-point values are stored in accordance with the rpm and the load of the engine.

* * * * *